United States Patent
Kong et al.

(10) Patent No.: US 6,372,156 B1
(45) Date of Patent: Apr. 16, 2002

(54) METHODS OF CHEMICALLY CONVERTING FIRST MATERIALS TO SECOND MATERIALS UTILIZING HYBRID-PLASMA SYSTEMS

(75) Inventors: Peter C. Kong; Jon D. Grandy, both of Idaho Falls, ID (US)

(73) Assignee: Bechtel BWXT Idaho, LLC, Idaho Falls, ID (US)

(*) Notice: Subject to any disclaimer, the term of this patent is extended or adjusted under 35 U.S.C. 154(b) by 0 days.

(21) Appl. No.: 09/377,583

(22) Filed: Aug. 19, 1999

(51) Int. Cl.$^7$ ................................................ C07C 1/02
(52) U.S. Cl. ...................... 252/373; 75/392; 75/710; 423/179; 423/437 R; 423/566.2; 423/563; 423/592; 423/608; 423/641; 423/645; 423/648.1; 423/650; 423/652; 423/659; 423/DIG. 10; 588/212
(58) Field of Search ................... 252/373; 423/DIG. 10, 423/648.1, 650, 652, 437 R, 645, 592, 563, 566.2, 641, 608, 179, 659; 588/212; 75/392, 710

(56) References Cited

U.S. PATENT DOCUMENTS 5,164,054 A * 11/1992 Cha et al. ................. 423/648.1

FOREIGN PATENT DOCUMENTS

FR 2689116 * 10/1993 .......... 423/DIG. 10

OTHER PUBLICATIONS

J.D. Grandy et al.; "Energy Consideration for Steam Plasma Gasification of Black Liquor and Chemical Recovery"; 12$^{th}$ International Symposium on Plasma Chemistry Proceedings vol. II, Aug. 21–25, 1995; pp. 1089–1094.

* cited by examiner

Primary Examiner—Wayne A. Langel
(74) Attorney, Agent, or Firm—Wells st. John Roberts Gregory & Matkin

(57) ABSTRACT

In one aspect, the invention encompasses a method of chemically converting a first material to a second material. A first plasma and a second plasma are formed, and the first plasma is in fluid communication with the second plasma. The second plasma comprises activated hydrogen and oxygen, and is formed from a water vapor. A first material is flowed into the first plasma to at least partially ionize at least a portion of the first material. The at least partially ionized first material is flowed into the second plasma to react at least some components of the first material with at least one of the activated hydrogen and activated oxygen. Such converts at least some of the first material to a second material. In another aspect, the invention encompasses a method of forming a synthetic gas by flowing a hydrocarbon-containing material into a hybrid-plasma system. In yet another aspect, the invention encompasses a method of degrading a hydrocarbon-containing material by flowing such material into a hybrid-plasma system. In yet another aspect, the invention encompasses a method of releasing an inorganic component of a complex comprising the inorganic component and an other component, wherein the complex is flowed through a hybrid-plasma system.

27 Claims, 4 Drawing Sheets

FIG. II

METHODS OF CHEMICALLY CONVERTING FIRST MATERIALS TO SECOND MATERIALS UTILIZING HYBRID-PLASMA SYSTEMS

CONTRACTUAL ORIGIN OF THE INVENTION

The United States Government has rights in this invention pursuant to Contract No. DE-AC07-941D 13223 between the United States Department of Energy and Lockheed Martin Idaho Technologies Company.

TECHNICAL FIELD

The invention pertains to methods of chemically converting first materials to second materials utilizing hybrid-plasma systems. In particular aspects, the hybrid plasma systems utilize a plasma comprising activated hydrogen and oxygen formed from a water vapor.

BACKGROUND OF THE INVENTION

Plasmas can be formed by ionizing one or more materials to convert the materials to a so-called plasma state. The plasma state of the materials generally comprises activated state atoms and ionized fragments of the materials. An interesting aspect of chemistry is that materials frequently undergo reactions that would not occur, or that would occur very slowly, if the materials were in some other form besides a plasma state. Accordingly, plasmas can be useful for causing materials to undergo chemical conversions. In spite of the understood utility of plasmas, there remains a need to develop improved plasma systems, and to develop methodologies for applying such plasma systems in applications having industrial utility.

SUMMARY OF THE INVENTION

In one aspect, the invention encompasses a method of chemically converting a first material to a second material. A first plasma and a second plasma are formed, and the first plasma is in fluid communication with the second plasma. The second plasma comprises activated hydrogen and oxygen, and is formed from a water vapor. A first material is flowed into the first plasma to at least partially ionize at least a portion of the first material. The at least partially ionized first material is flowed into the second plasma to react at least some components of the first material with at least one of the activated hydrogen and activated oxygen. Such converts at least some of the first material to a second material.

In another aspect, the invention encompasses a method of forming a synthetic gas by flowing a hydrocarbon-containing material into a hybrid-plasma system.

In yet another aspect, the invention encompasses a method of degrading a hydrocarbon-containing material by flowing such material into a hybrid-plasma system.

In yet another aspect, the invention encompasses a method of releasing an inorganic component of a complex comprising the inorganic component and another component, wherein the complex is flowed through a hybrid-plasma system.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The invention encompasses methodology and apparatuses configured for forming and utilizing hybrid-plasma systems. For purposes of interpreting this disclosure and the claims that follow, a "hybrid plasma system" is defined as a plasma system comprising at least two spaced and separate plasma-forming components. Such plasma forming components can comprise, for example, plasma torches, or inductive coils. Hybrid plasmas of the present invention can comprise two overlapping plasmas where each of such overlapping plasmas is a plasma region. The hybrid plasmas of the present invention preferabiy comprise at least one region that is a so-called steam plasma. A steam plasma is defined as a plasma which comprises activated hydrogen and oxygen formed from a water vapor. In preferred aspects of the present invention a hybrid plasma system comprises a first, smaller plasma-forming component, which is utilized to activate chemical components of a first material, and a second, larger plasma-forming component into which the activated chemical components are fed. Particular aspects of the invention are described with reference to FIGS. 1–4.

Figure 1:
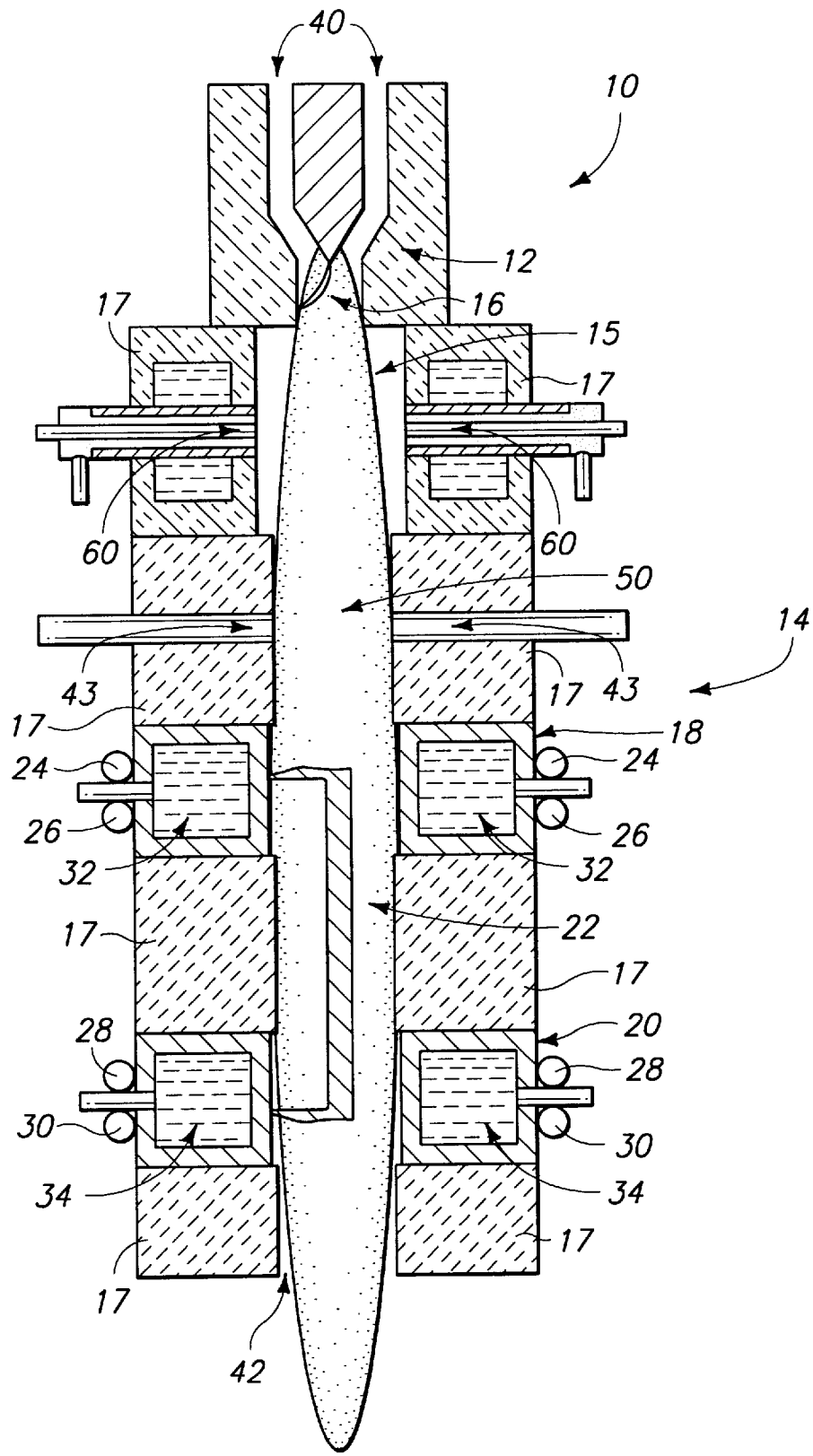
FIG. 1 is a diagrammatic, cross-sectional side view of a first embodiment hybrid-plasma system encompassed by the present invention.

Referring first to FIG. 1, a first embodiment plasma system 10 encompassed by the present invention is illustrated. Plasma system 10 comprises a reaction chamber 15, which is shown in a cross-sectional view in FIG. 1. In three dimension, reaction chamber 15 has a tubular shape. A number of ports extend into chamber 15 (for example, ports 43 and 60), and the operation of such ports is described below. The various ports are shown in cross-sectional view, and accordingly appear to be provided in paired configuration which enter chamber 15 from opposing sides of chamber 15. Such can be the actual orientation of the ports. Alternatively, the ports can extend entirely around a periphery of a tubular reaction chamber such that an apparent paired configuration of a port (such as, for example, port 43) in the cross-sectional view of FIG. 1 corresponds to opposing sides of a single port that extends continuously around the periphery of chamber 15.

A first direct current (DC) plasma torch 12, and a second DC plasma torch 14 are included within system 10, and a hybrid plasma 50 extends between torches 12 and 14. System 10 can be referred to as a DC/DC hybrid steam plasma torch. Torch 12 can comprise a commercially available plasma torch. For instance, plasma torch 12 can be obtained as a METRO 9 MB Plasma Spray Gun (from METRO, Inc. of 1101 Prospect Ave, Westbury, N.Y., 11590). Plasma torch 14 can be specifically designed and configured for the shown process based upon the energy output desired and the volume of chamber 15.

First torch 12 comprises a pair of electrodes (not labeled) and an electric arc 16 extending between the electrodes.

Second torch 14 comprises a pair of electrodes 18 and 20, and an arc 22 extending between such electrodes. Field coils 24,26,28 and 30 extend around electrodes 18 and 20 of second torch 14. Channels 32 and 34 extend within electrodes 18 and 20 and enable a cooling fluid (such as, for example, water) to be flowed through electrodes 18 and 20.

Insulative materials 17 separate electrodes 18 and 20, and further separate torches 12 and 14.

An inlet 40 extends downwardly into system 10, and an outlet 42 extends from a bottom of system 10. In operation, a first material is flowed into inlet 40 and at least partially ionized by arc 16 to form a first component of plasma 50 within system 10. If the first material is a liquid, such material is preferably atomized before entering inlet 40, and if the first material is a solid, such material is preferably finely dispersed as a powder before entering inlet 40. Regardless of whether the first material is a solid or a liquid, the first material can be accompanied by a plasma-forming gas, such as, for example, nitrogen, argon, hydrogen, methane or water vapor (such as, for example, steam), as the material enters inlet 40.

Water is introduced into system 10 through an inlet port 60. Such water is preferably atomized before introduction into plasma 10, and forms activated hydrogen and oxygen within plasma 50. The atomized water can comprise one or both of liquid and gaseous (vapor) forms of water. Inlet port 60 can also be utilized for introduction of liquid feed materials into system 10. For instance a corrosive material (such as the black liquor discussed below) can be provided into system 10 through inlet port 60 rather than through inlet 40. Such can avoid having the corrosive material contact and degrade electrodes associated with first torch 12.

Two alternative manners of describing hybrid plasma 50 are as follows. First, hybrid plasma 50 can be considered as comprising two overlapping plasmas, with a first plasma being proximate arc 16, and a second plasma being proximate arc 22. The first plasma comprises ionized species of the material introduced through inlet 40, and the second plasma comprises such ionized species, as well as activated hydrogen and oxygen from the water vapor introduced through inlets 60.

The second manner of describing hybrid plasma 50 is to consider the hybrid plasma to comprise two plasma-regions, with a first region being proximate arc 16 and a second region being proximate arc 22. The first region comprises ionized species of the material introduced through inlet 40, and the second region comprises such ionized species, as well as activated hydrogen and oxygen from the water vapor in produced through inlets 60.

Both of the above-described two manners of referring to hybrid plasma 50 will be utilized in this disclosure.

Referring again to the path of a material through system 10, ionized first material moving from the first plasma region (proximate arc 16) into the second plasma region (proximate arc 22) reacts with at least one of the activated hydrogen and activated oxygen of the second plasma region to convert at least a portion of the first material to a second material. Such second material exits from outlet 42.

In the shown preferred embodiment, a swirl gas inlet 43 is provided. A gas can be flowed into plasma 50 through inlet 43 to swirl plasma 50 in a circular motion within reaction chamber 15. The gas flowed through inlet 43 can comprise, for example, methane, hydrogen, nitrogen or argon. The swirling, or moving, of plasma 50 within chamber 15 can prolong electrode life, as well as increase mixing of reaction components.

In one aspect of utilizing system 10, the first material introduced into inlet 40 comprises hydrocarbon. Such hydrocarbon can be reacted with the activated hydrogen and oxygen of hybrid plasma 50 to form a synthetic gas comprising $H_2$ and CO, or can be reacted to degrade the hydrocarbon to $H_2O$ and $CO_2$. If synthetic gas is formed, it can then be burned to provide at least some of the power for operating system 10, and to thereby recover at least some of the energy utilized by system 10.

System 10 can be regulated to shift reactions occurring within plasma 50 toward either degradation of hydrocarbon components or conversion of the hydrocarbon components to a synthetic gas. Specifically, if plasma 50 is formed to comprise a more reducing atmosphere, reactions within plasma 50 are shifted toward formation of synthetic gases from hydrocarbon components. Alternatively, if plasma 50 comprises an oxidizing environment, the plasma will tend to degrade hydrocarbon components toward water and carbon dioxide.

Plasma 50 can be adjusted to comprise a reducing environment by enhancing an amount of reductant within plasma 50. Specifically, a hydrogen content of plasma 50 can be increased by providing suitable gases comprising significant amounts of hydrogen such as, for example, methane. Alternatively, an oxidative nature of plasma 50 can be increased by adding oxygen to plasma 50. Such oxygen can be added by, for example, flowing additional $O_2$ or air into plasma 50.

The above-described conversion of hydrocarbon to either synthetic gas ($H_2$ and CO) or degradation products ($H_2O$ and $CO_2$) illustrates an aspect of the invention. Specifically, it illustrates a recognition that a steam plasma advantageously has about a neutral balance between oxidative and reductive characteristics (with the reductive characteristics being provided by activated hydrogen in the plasma, and the oxidative characteristics being provided by activated oxygen in the plasma), and that the balance between the oxidative and reductive characteristics can be tipped toward a more reductive environment by adding additional hydrogen to the plasma, or can be tipped toward a more oxidative environment by adding additional oxygen to the plasma.

An application in which it can be advantageous to form a synthetic gas from plasma 50 is an industrial process wherein plasma system 10 is coupled with a paper production facility. Specifically, the production of paper produces what is referred to as a "black liquor" which comprises hydrocarbon materials, as well as inorganic chemicals (sodium and sulfur). Such black liquor can be provided to plasma system 10 as a first material entering inlet 60, and exiting plasma system 10 as a synthetic gas comprising $H_2$ and CO. In such applications, hybrid plasma 50 preferably comprises a reaction temperature of greater than about 3,000° K. Such can be accomplished by utilizing a first plasma torch 12 having a power of at least 6 kilowatts and a second plasma torch 14 having a power of at least 6 kilowatts. In is exemplary applications, hybrid plasma jet 50 can be at temperatures in excess of 5000° K, and can accordingly form a highly reactive plasma environment.

During the conversion of the black liquor to a synthetic gas, first plasma torch 12 can provide pre-ionization of materials flowed into system 10, as well as continuous ignition of high power torch 14. For instance, first plasma torch 12 can provide ionized species to sustain arc 22 of second plasma torch 14. Second plasma torch 14 can increase ionization of a plasma jet exiting from first plasma torch 12 to thus increase overall enthalpy of system 10.

Upon exiting hybrid plasma 50, super heated gases emanate, and can form a relatively clean synthetic gas product.

Outlet 42 can be coupled with an apparatus configured to condense gases emanating from hybrid plasma 50. Further, if the plasma environment comprises reducing conditions, Na and S components of the black liquor can be collected as $Na_2S$ and $Na_2O$ powders (in a relatively dry, i.e., void of water, form). Such inorganic chemicals are then in a so-called auto-caustisizing form, which is desired for recycling in a paper production process.

Another application of the present invention is for forming either nano-powders or deposits of inorganic materials. Specifically, an inorganic material can be introduced into inlet 60, and can comprise a complex of an inorganic component chemically joined with one or more organic components (such as, for example, hydrocarbon components), or a purely inorganic complex, such as for example a metal nitrate. If the inorganic material comprises a complex of an inorganic component and an organic component, the organic component can react with activated hydrogen and oxygen of the hybrid plasma to release the inorganic component from the chemical complex. Such inorganic component then exits from outlet 42. If outlet 42 is in fluid communication with an apparatus having a cooled substrate provided therein, the inorganic component can be vapor deposited on the substrate. Accordingly, the inorganic component is chemical vapor deposited onto the substrate. If, on the other hand, outlet 42 is in fluid communication with an apparatus that does not have a substrate, but rather is configured for condensing the inorganic component into fine particles, the component will form a powder, which can have grain sizes on the order of $10^{-9}$ meters (nanometers).

In other embodiments, if the inorganic complex comprises a metal nitrate, one or both of the nitrogen and the metal of the metal nitrate can react with the activated hydrogen and oxygen of the hybrid plasma to cause the metal to be released from the metal nitrate as either an elemental form of the metal, a metal oxide or a metal hydride. For instance, the Ni of $Ni(NO_3)_2$ can be converted to either elemental Ni or an oxide of Ni. Likewise, the zirconium of zirconium nitrate can be converted to either elemental zirconium or to an oxide of zirconiumn.

The system 10 described with reference to FIG. 1 is but one exemplary embodiment of a hybrid plasma system encompassed by the present invention. Other exemplary hybrid plasma systems are described with reference to FIGS. 2–4.

Figure 2:
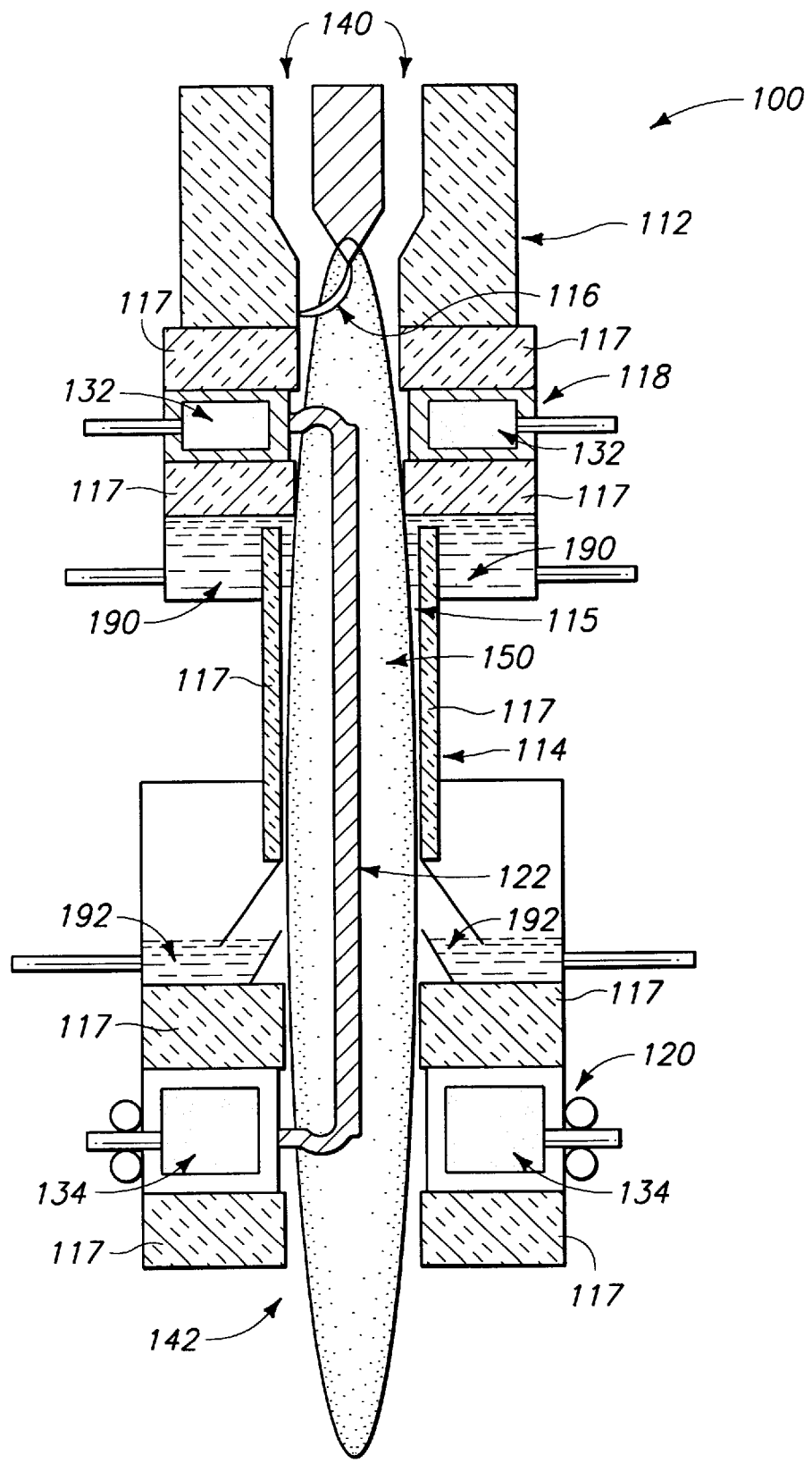
FIG. 2 is a diagrammatic, cross-sectional side view of a second embodiment hybrid-plasma system encompassed by the present invention.

Referring to FIG. 2, a second embodiment system 100 is shown. System 100 comprises a reaction chamber 115, a first plasma torch 112 and a second plasma torch 114. First plasma torch forms an arc 116, and second plasma torch 114 forms an arc 122. A hybrid plasma 150 extends between arcs 116 and 122. An inlet 140 is provided above chamber 115 is and an outlet 142 is provided below chamber 115. Insulative materials 117 separate electrodes 118 and 120, and further separate torches 112 and 114.

Second plasma system 100 is similar to first plasma system 10, with the exception that the swirl gas inlet 43 of FIG. 1 is replaced with a water inlet 190. Such water inlet injects water at high pressure into reaction chamber 115 to flow the water along internal sidewalls of the reaction chamber. The flowing water forms a thin moving wall around hybrid plasma 150 and can be utilized to keep the material of plasma 150 moving. The water ultimately flows down to a reservoir 192, where it is collected and from which it can be recirculated to inlet 190.

Figure 3:
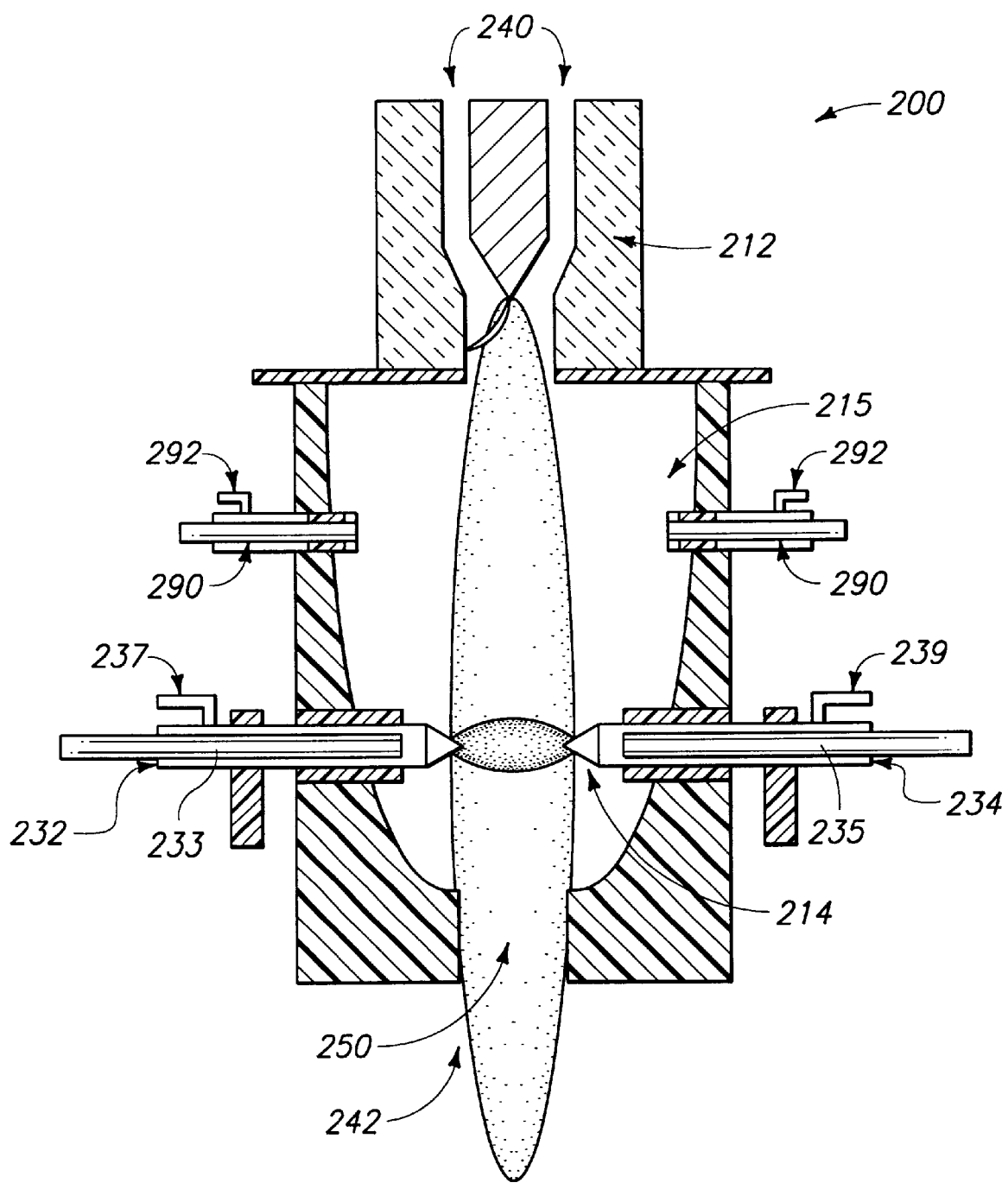
FIG. 3 is a diagrammatic, cross-sectional side view of a third embodiment hybrid-plasma system encompassed by the present invention.

Another embodiment hybrid plasma system encompassed by the present invention is described with reference to FIG. 3 as a system 200. System 200 comprises a first plasma torch 212 and a second plasma torch 214, and forms a hybrid plasma 250. First plasma torch 212 is a DC torch, and second plasma torch 214 can be either an AC or DC plasma torch. Accordingly, system 200 can be either a DC/AC or DC/DC hybrid plasma torch system. System 200 comprises a liquid inlet 290 spaced about midway between first plasma torch 212 and second plasma torch 214. Liquid inlet 290 has a gas inlet 292 associated therewith for atomizing liquid as it is injected into a reaction chamber 215.

System 200 further comprises a cooling fluid inlet associated with a first electrode 233 of second plasma torch 214 and another cooling water inlet 234 associated with a second electrode 235. Additionally, system 200 comprises cooling fluid outlets 237 and 239 associated with electrodes 233 and 235, respectively. System 200 comprises an inlet 240 wherein a first material enters system 200, and an outlet 242 wherein a second material exits system 200.

Figure 4:
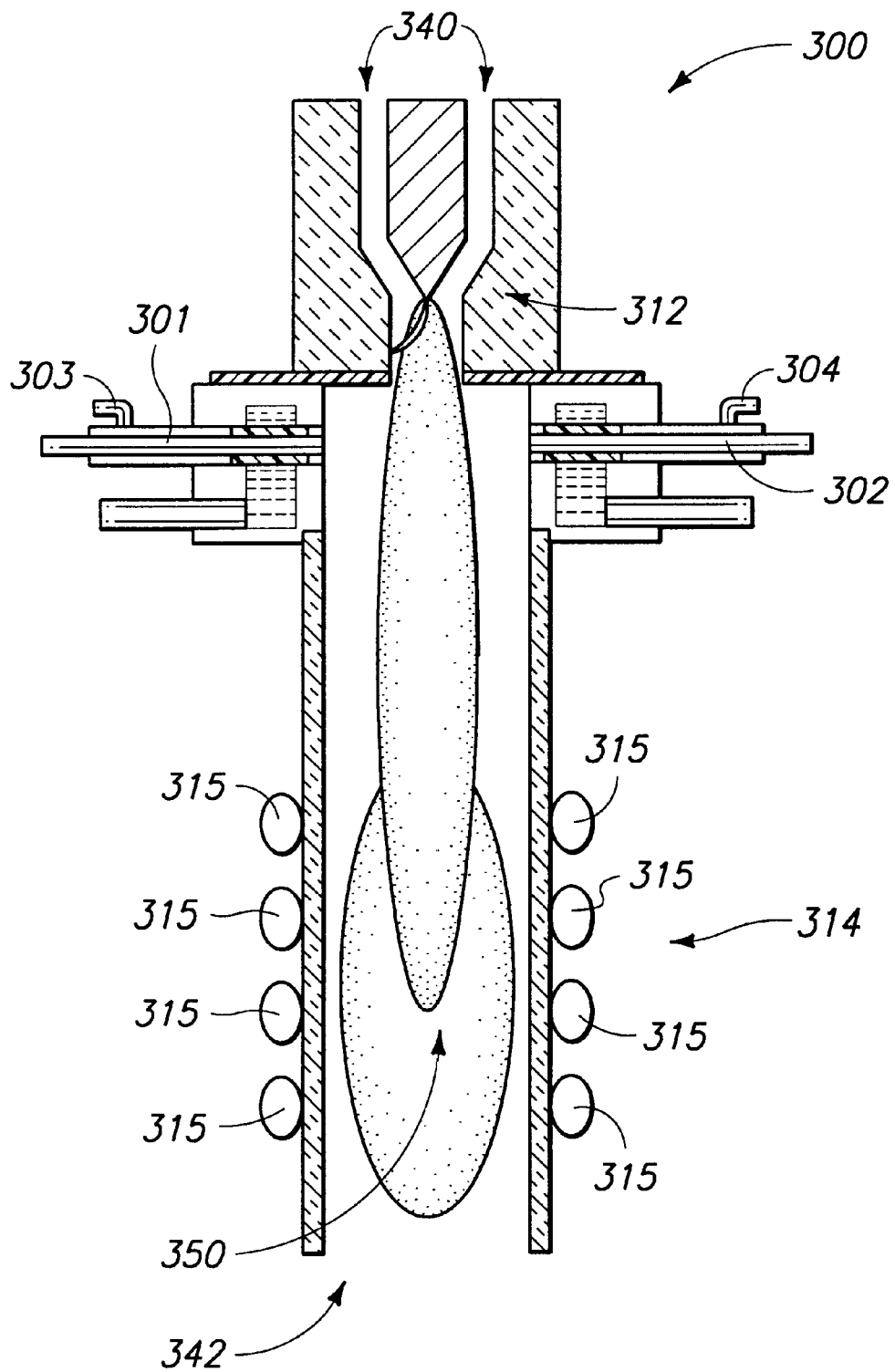
FIG. 4 is a diagrammatic, cross-sectional side view of a fourth embodiment hybrid-plasma system encompassed by the present invention.

Yet another system encompassed by the present invention is described with reference to FIG. 4 as a system 300. System 300 comprises a first plasma torch 312 which is a DC torch, and a second plasma generation system 314 which utilizes RF coils 315 to induce a plasma. System 300 is therefore a DC/RF system. A hybrid plasma 350 is formed within a tubular reaction chamber 315 of system 300. Water vapor is introduced into system 300 through liquid injection ports 301 and 302 which are coupled with gas inlets 303 and 304, respectively, and which accordingly atomize water as it is injected into reaction chamber 315. System 300 comprises an inlet 340 and an outlet 342.

Although the systems described above have a first torch elevationally displaced from a second torch, and although such is preferable so that materials introduced from above the first torch flow by gravity into the second torch and out of an outlet, it is to be understood that the systems could be provided in alternative configurations wherein the first torch is laterally displaced from the second torch, and wherein a conveyance is provided for flowing material into and out of the reaction chamber. For instance, a high pressure gas can be utilized as a conveyance for forcing materials into reaction chambers and out of the reaction chambers along a defined flow path. In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of chemically converting a first material to a second material, comprising:

providing a first arc to generate and maintain a first plasma region;

providing a second arc to generate and maintain a second plasma region, the second arc being downstream of the first arc along a first material flow path and spaced from the first arc by a gap;

providing a water inlet in the gap between the first and second arcs; and flowing water through the inlet to provide at least some of the water vapor for the second plasma region;

forming a hybrid plasma comprising a first plasma in the first plasma region and a second plasma in the second plasma region, the second plasma region being downstream from the first plasma region along a first material flow path, wherein the second plasma comprises activated hydrogen and activated oxygen formed from a water vapor;

flowing the first material into the first plasma region to at least partially ionize at least a portion of the first material; and flowing the at least partially ionized first material into the second plasma region to react at least some components of the first material with at least one member selected from the group consisting of the activated hydrogen and activated oxygen and to thereby convert at least some of the first material to a second material.

2. The method of claim 1 wherein the first material comprises a liquid, and wherein such liquid is atomized prior to flowing the liquid into the first plasma region.

3. The method of claim 1 wherein the first material comprises a solid, and wherein such solid is dispersed as a powder as it is flowed into the first plasma region.

4. The method of claim 1 further comprising:
mixing water with the first material;
atomizing the mixture of water and first material;
flowing the atomized mixture into the first plasma region to ionize at least some of the mixture; and
flowing the mixture from the first plasma region to the second plasma region.

5. The method of claim 1 wherein the second arc is elevationally below the first arc.

6. The method of claim 1 wherein at least some of the water flowed through the inlet is a vapor form.

7. The method of claim 1 wherein at least some of the water flowed through the inlet is in a liquid form.

8. The method of claim 1 further comprising:
providing a first arc to generate and maintain the first plasma region;
providing a second arc to generate and maintain the second plasma region, the second arc being downstream of the arc along the first material flow path and being elevationally below the first arc;
providing a water inlet at an elevational level of at least a portion of the second arc; and
flowing water through the inlet to provide at least some of the water vapor for the second plasma region.

9. The method of claim 1 wherein the first material comprises at least one hydrocarbon component, the method further comprising reacting at least some of the hydrocarbon component with the activated hydrogen and oxygen of the second plasma region to form a synthetic gas comprising $H_2$ and CO.

10. The method of claim 1 wherein the first material comprises at least one hydrocarbon component, the method further comprising reacting at least some of the hydrocarbon component with the activated hydrogen and oxygen of the second plasma region to form water and carbon dioxide.

11. The method of claim 1 wherein the first material comprises a metal nitrate and wherein the metal of the first material is converted to one or more members selected from the group consisting of a metal hydride, a metal oxide, and an elemental form by the reaction of at least some components of the metal nitrate with the activated hydrogen and activated oxygen.

12. The method of claim 1 wherein the first material comprises at least one chemical complex comprising a hydrocarbon component chemically attached to an inorganic component, the method further comprising reacting at least some of the hydrocarbon component with the activated hydrogen and oxygen of the second plasma region to release the inorganic component from the chemical complex.

13. The method of claim 12 wherein the released inorganic component is vapor deposited on a substrate.

14. The method of claim 12 wherein the released inorganic component is condensed to form a powder.

15. The method of claim 1 wherein the first material comprises a black liquor effluent from a paper manufacturing process, the black liquor comprising an inorganic component, the method further comprising reacting at least some of the inorganic component with the activated hydrogen of the second plasma region to form the second material, said second material comprising at least one reduced form of the at least some of the inorganic component.

16. The method of claim 15 wherein said inorganic component comprises S and Na; and wherein the at least one reduced form comprises one or more members selected from the group consisting of $H_2S$, $Na_2S$ and $Na_2O$.

17. The method of claim 1 wherein the first material comprises a black liquor effluent from a paper manufacturing process, the black liquor comprising at least one hydrocarbon component, the method further comprising reacting at least some of the hydrocarbon component with the activated hydrogen and oxygen of the second plasma region to form a synthetic gas comprising $H_2$ and CO.

18. A method of forming a synthetic gas, comprising:
providing a first arc to generate and maintain a first plasma region;
providing a second arc to generate and maintain a second plasma region, the second arc being downstream of the first arc along a hydrocarbon-containing material flow path and spaced from the first arc by a gap;
providing a water inlet in the gap between the first and second arcs; and
flowing water through the inlet to provide at least some of a water vapor for the second plasma region;
forming a hybrid plasma comprising a first plasma in the first plasma region and a second plasma in the second plasma region, the second plasma comprising activated hydrogen and activated oxygen and being formed from the water vapor, wherein the second plasma region is downstream of the first plasma region along the hydrocarbon-containing material flow path;
flowing a hydrocarbon-containing material into the first plasma region to at least partially ionize at least a portion of the hydrocarbon; and
flowing the at least partially ionized hydrocarbon along the hydrocarbon-containing material flow path into the second plasma region to react the at least partially ionized hydrocarbon with the activated hydrogen and activated oxygen to convert the at least partially ionized hydrocarbon to a synthetic gas comprising $H_2$ and CO.

19. The method of claim 18 further comprising:
mixing water with the hydrocarbon-containing material;
atomizing the mixture of water and hydrocarbon-containing material;
flowing the atomized mixture into the first plasma region to ionize at least some of the mixture; and
flowing the mixture from the first plasma region to the second plasma region.

20. The method of claim 18 wherein the second arc is elevationally below the first arc.

21. The method of claim 18 wherein at least some of the water flowed through the inlet is in a vapor form.

22. The method of claim 18 wherein at least some of the water flowed through the inlet is in a liquid form.

23. A method of degrading a hydrocarbon-containing material, comprising:

provm a first arc to generate and maintain a first plasma region;

providing a second arc to generate and maintain a second plasma region, the second arc being downstream of the first arc along a hydrocarbon-containing material flow path and spaced from the first arc by a gap;

providing a water inlet in the gap between the first and second arcs; and flowing water through the inlet to provide at least some of a water vapor for the second plasma region;

forming a hybrid plasma comprising the first plasma region and the second plasma region, the second plasma region comprising activated hydrogen and activated oxygen and being formed from the water vapor, wherein the second plasma region is downstream of the first plasma region along the hydrocarbon-containing material flow path;

flowing a hydrocarbon-containing material into the first plasma region to at least partially ionize at least a portion of the hydrocarbon; and flowing the at least partially ionized hydrocarbon into the second plasma region to react the at least partially ionized hydrocarbon with the activated hydrogen and activated oxygen to convert the at least partially ionized hydrocarbon to $H_2O$ and $CO_2$.

24. The method of claim 23 further comprising:

mixing water with the hydrocarbon-containing material;

atomizing the mixture of water and hydrocarbon-containing material;

flowing the atomized mixture into the first plasma region to ionize at least some of the mixture; and flowing the mixture from the first plasma region to the second plasma region.

25. The method of claim 23 wherein the second arc is elevationally below the first arc.

26. The method of claim 23 wherein at least some of the water flowed through the inlet is in a vapor form.

27. The method of claim 23 wherein at least some of the water flowed through the inlet is in a liquid form.

\* \* \* \* \*